Figure 3:
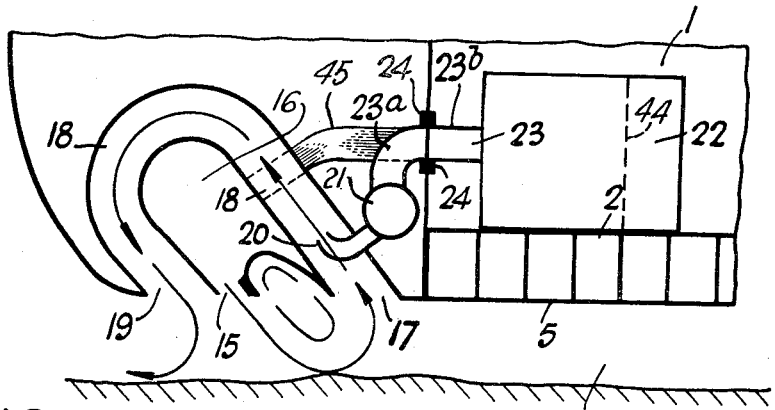

May 4, 1965  D. W. NICHOLAS ETAL  3,181,639
VEHICLES FOR TRAVELLING OVER A SURFACE
Filed March 11, 1963  4 Sheets-Sheet 1
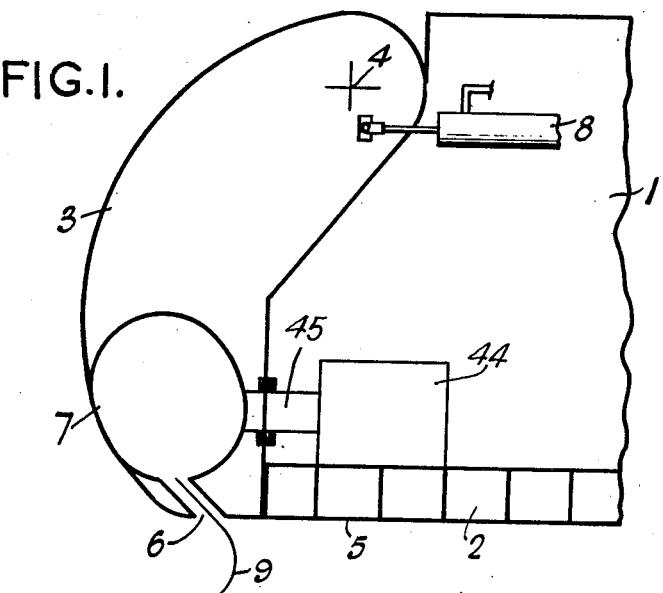
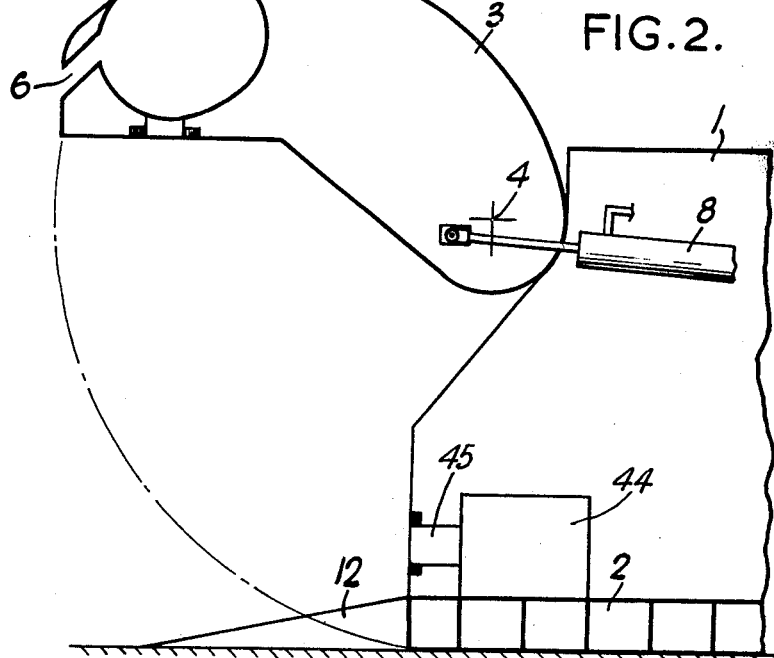
INVENTORS
D. W. NICHOLAS
J. T. EVEREST
BY Cameron, Kerkam + Sutton
ATTORNEYS INVENTORS
D. W. NICHOLAS
J. T. EVEREST
BY Cameron, Kerkam & Sutton
ATTORNEYS May 4, 1965  D. W. NICHOLAS ETAL  3,181,639
VEHICLES FOR TRAVELLING OVER A SURFACE
Filed March 11, 1963  4 Sheets-Sheet 4

INVENTORS
D. W. NICHOLAS
J. T. EVEREST
BY Cameron, Kerkam + Sutton
ATTORNEYS

United States Patent Office 3,181,639
Patented May 4, 1965

3,181,639
VEHICLES FOR TRAVELLING OVER A SURFACE
David William Nicholas, Southampton, and Julian Thomas Everest, South Darenth, near Dartford, England, assignors to Hovercraft Development Limited, London, England, a British company
Filed Mar. 11, 1963, Ser. No. 264,271
Claims priority, application Great Britain, Mar. 12, 1962, 9,489/62
12 Claims. (Cl. 180—7)

This invention relates to vehicles which are supported above a surface by at least one cushion of pressurised gas formed and contained beneath the vehicle.

In such vehicles it has been proposed to contain the gaseous cushion, at least in part, by one or more curtains of moving fluid issuing from the bottom of the vehicle. The gaseous cushion may be contained for the remainder of its periphery by structural members, by further curtains of fluid or by a combination of both.

It is usual to supply the fluid for forming the fluid curtain through ducts positioned adjacent to the periphery of the vehicle and sometimes the means for energising the fluid for forming the fluid curtains is also positioned at or near the periphery. The ducts, and energising means, extend for a height which cannot be reduced below a minimum dimension due to the required mass flow of the fluid for the curtains and also structural reasons. To maintain the volume of the gaseous cushion to a minimum, the bottom surface of the vehicle is usually at the same level as that part of the vehicle from which issues the fluid forming the curtain. The ducts, and energising means when positioned adjacent to the periphery of the vehicle, form in effect a wall extending upwards from the bottom surface of the vehicle. Where it is desired to carry freight in the bottom of the vehicle, such as when used for a motor vehicle ferry or the like, this wall forms an obstacle to the quick loading and unloading of the motor vehicles. Either the vehicle has to be loaded and unloaded by hoist or rather extensive ramps or similar facilities are required. Ramps inside the vehicle result in a considerable loss of room and are also inconvenient. Whilst ramps external to the vehicle can more readily be provided, these again are inconvenient and may result in slow rates of loading and unloading.

By making at least part of the ducting movable it is possible to avoid, at least to some extent, the difficulties in loading and unloading, and according to the invention there is provided a vehicle for travelling over a surface which is at least partly supported above the surface by a cushion of pressurised gas formed and contained beneath the vehicle, the cushion being contained for at least part of its periphery by a curtain of moving fluid issuing from the bottom of the vehicle, wherein at least part of the structure through which the fluid is supplied is pivotally attached to the main vehicle structure on a substantially horizontal axis, whereby the pivotally attached structure can be rotated upwards sufficiently for loads to be conveyed on and off the vehicle by passing beneath the structure when it is in its upward position.

In a particular form of vehicle the fluid energising means comprises at least one pump positioned with its rotational axis parallel to the periphery of the vehicle. Normally the pump is positioned adjacent to the point of issue of the fluid forming the curtain but this may cause a further obstacle to loading and unloading. According to a feature of the present invention the fluid energising means comprises at least one rotary pump mounted with its rotary axis coincidental with the axis about which rotates the said part of the structure through which the fluid is supplied, the outer casing of the pump rotating with the said part of the structure. By this means the connection between the pump outlet and the structure through which the fluid for the curtain is supplied is not interfered with when the structure is rotated, and also the drive to the pump need not be disconnected.

The structure which rotates may also include that part of the vehicle structure from which issues the curtain-forming fluid. Alternatively the part of the vehicle structure from which issues the curtain-forming fluid may remain attached to the main part of the vehicle, there being a joint between the structure which rotates and the structure from which issues the curtain-forming fluid at a low level which does not interfere with the loading of the vehicle.

The invention can be applied to a vehicle of the type in which the cushion is at least in part contained along the sides of the vehicle by downwardly depending walls, the cushion being contained at the front and rear of the vehicle, in the vertical sense, for the upper part by a structural member and for the lower part by a fluid curtain. In such a vehicle it is possible to vary the height sealed by the structural member, as is described and illustrated in the co-pending U.S. application of Edward Gunston Tattersall, Serial No. 215,440, filed August 7, 1962, corresponding to British application No. 29,708/61. When the present invention is applied to such a vehicle, the part of the structure which according to the present invention can rotate upwards, forms at least part of the structural member which contains the cushion at the front and rear of the vehicle as described in the above-mentioned co-pending application. Thus according to a further feature of the invention, at least one end of the vehicle, the said part of the structure from which issues the curtain of fluid, also serves to contain the upper part of the gaseous cushion and the rotation of the said part of the structure about the said axis can be controlled during operation of the vehicle so as to vary the height sealed by the structure.

Figure 4:
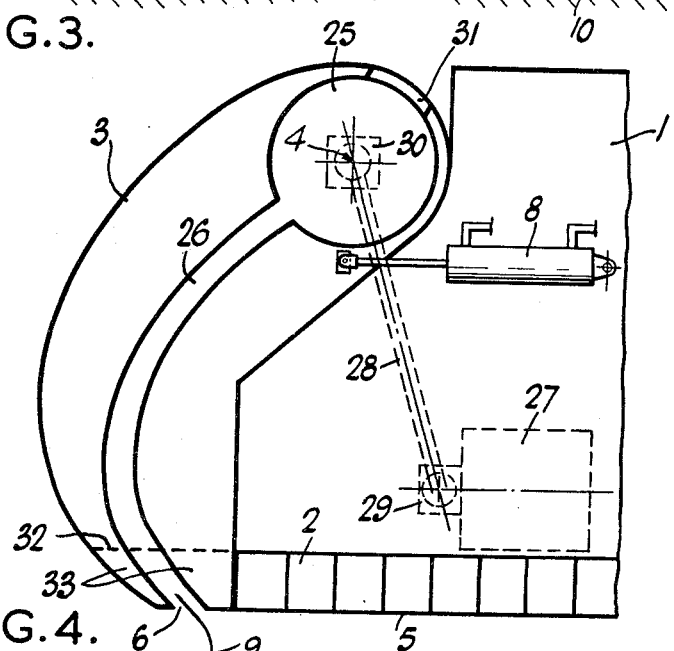
Figure 5:
Figure 6:
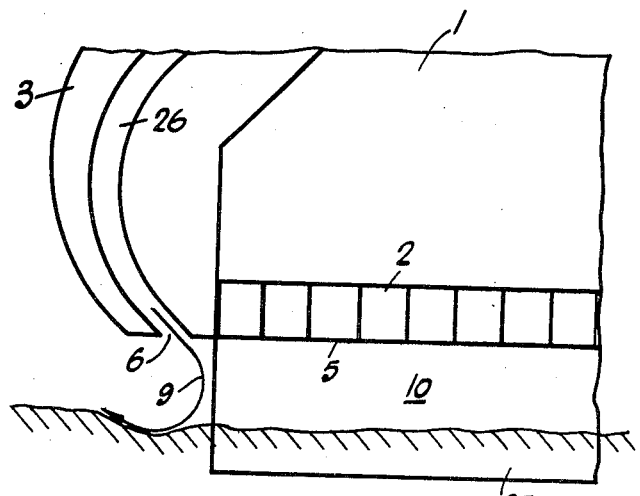
Figure 9:
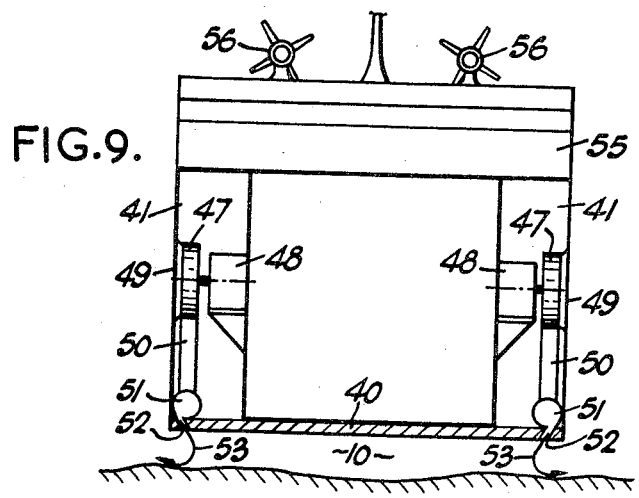
Figure 7:
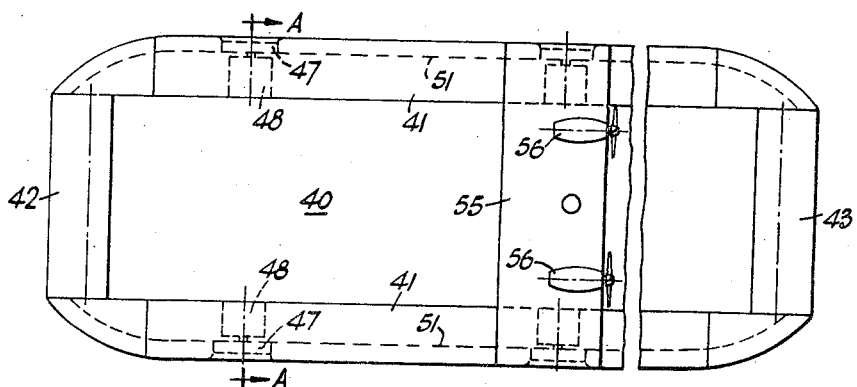
Figure 8:
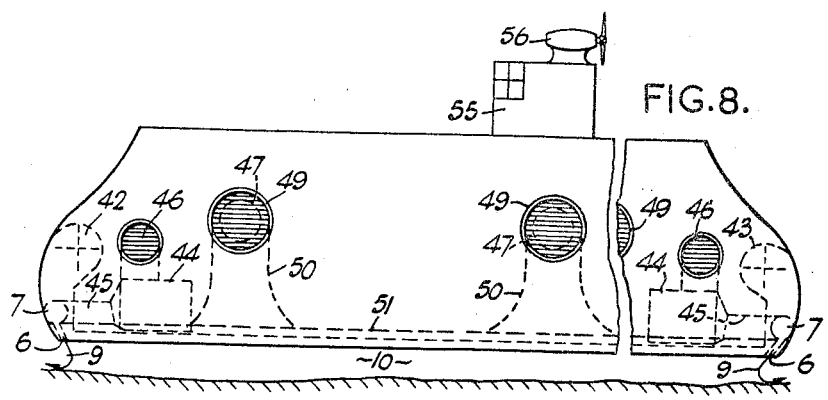

The invention will be readily understood from the following description of some embodiments with reference to the accompanying drawings in which:

FIGURE 1 is a diagrammatic vertical cross-section parallel to the fore and aft axis through one end of a vehicle, FIGURE 2 is a similar cross-section to FIGURE 1 and showing part of the structure in its upwardly rotated position, FIGURE 3 illustrates a modification of the structure shown in FIGURES 1 and 2, FIGURE 4 is a similar cross-section to FIGURE 1 illustrating an alternative form of vehicle, FIGURE 5 illustrates a modification of the embodiment illustrated in FIGURE 4, FIGURE 6 illustrates a further modification of the embodiment illustrated in FIGURE 4, FIGURE 7 is a diagrammatic plan view of a vehicle embodying the invention, FIGURE 8 is a diagrammatic side view of the vehicle illustrated in FIGURE 7, and FIGURE 9 is a cross-section on the line A—A of FIGURE 7.

FIGURES 1 and 2 illustrate a construction which can be used at any convenient position in the periphery of a vehicle, in the present example being described as being at one end of a vehicle. The main body or structure 1 of the vehicle has a load carrying floor 2. Attached to the end of the main body and extending across the width thereof is a structure 3 which can rotate about an axis 4, the axis being parallel to the bottom surface 5 of the vehicle. Formed in the bottom of the structure 3 is a supply port 6 to which air is supplied from a duct 7. In operation the air issues from the supply port 6 to form a curtain of moving air 9. Further supply ports are provided in the bottom of the main body of the vehicle along the sides thereof and further curtains of air form and contain a cushion of pressurized air beneath the vehicle in the space 10. The structure 3 can be rotated upwards about the axis 4 by means of a hydraulic jack 8. The supply of air to the duct 7, and the position of the further supply ports along the sides of the vehicle is illustrated in FIGURES 7, 8 and 9, only one compressor 44 and its associated supply duct 45 being shown in FIGURES 1 and 2.

It will be appreciated that if the structure 3 was fixed immovably to the main body of the vehicle, although access could readily be provided through the structure 3 into the interior of the vehicle, this access would have to be above the duct 7 and ramps would be required inside the vehicle and outside the vehicle. By attaching the structure 3 to the main body of the vehicle so that it can be rotated upwards when the vehicle is inoperative, as in FIGURE 2, then there is ready and convenient access to the interior of the vehicle. If the vehicle is standing on a hard surface, such as the ground, then a small ramp 12 is all that is required. If the vehicle is floating on water a short gangway or the like will suffice to bridge between the vehicle and the loading platform. The hydraulic jack 8 in addition to rotating the structure to its upward position can also be used to maintain the structure firmly in its closed or downward position when the vehicle is operative.

FIGURES 1 and 2 illustrate a vehicle in which a simple single air curtain is formed from the bottom of the structure 3. FIGURE 3 illustrates a modification in which a more complex air curtain is formed. In this example, a supply port 15 is formed in the bottom of the structure 3 and is fed via a duct 16 which receives air from a compressor 44 through a duct 45, similarly to the embodiment of FIGURES 7, 8 and 9. Spaced slightly inboard of the supply port 15 and parallel thereto is a recovery port 17. The recovery port 17 is connected by a transfer duct 18 formed around the duct 16 to a further supply port 19 outboard of and adjacent to supply port 15. In operation air initially issues from the supply port 15 in a downwards and inwards direction and, after formation of the cushion of pressurized air in space 10 is deflected round and upwards into the recovery port 17. From the recovery port 17 the air flows via the transfer duct 18 to the further supply port 19. Thus more efficient use is made of the curtain-forming air.

The recovered air can be re-energised by injectors 20. If provided, the injectors 20 are supplied with air from a duct 21. Air is fed to the duct 21 from compressors 22 through ducts 23. The ducts 23 are in two parts, one part 23a being situated in the structure 3 and the other part 23b being in the main body of the vehicle 1. Sealing means 24 prevent leakage at the joint between the two parts of the ducts.

FIGURE 4 illustrates the application of the invention to a vehicle in which the air for forming the curtain is energized by a rotary pump 25 the axis of rotation of which is substantially parallel to the periphery of the vehicle. Various examples of such pumps are described and illustrated in the co-pending U.S. application of Christopher Sydney Cockerell, Serial No. 100,420, filed April 3, 1961, based on British applications Nos. 12,688/60 and 35,626/60. As illustrated in FIGURE 4, the pump 25 is arranged with its rotational axis coincident with the axis 4 about which the structure 3 rotates. The pump outlet is connected to the supply port 6 by a duct 26. By arranging for the axis of rotation of the pump to be coincident with the axis 4, it is possible to rotate the structure 3, by the hydraulic jack 8, without interfering with the pump 25. Thus, for example, if the pump 25 is driven by an engine 27 positioned at the side of the vehicle via a shaft 28 and gearing 29, 30, rotation of the structure 3, with the pump casing, about the axis 4 will not require disconnection of the drive between the engine 27 and the pump 25. Air is supplied to the pump 25 via a suitable intake, for example via inlet 31.

As stated above, it can be arranged that that part of the vehicle structure from which issues the curtain-forming fluid remains attached to the main part of the vehicle. Thus, in FIGURE 4, for example, a joint can be provided, indicated by the dotted line 32, the rotatable structure 3 extending down only to this joint. The port 6 from which issues the curtain-forming air then remains attached to the main part of the vehicle. One advantage of such an arrangement is that no sealing is required between the main part of the vehicle and the rotatable structure to avoid leakage of the cushion air. The part 33 could be so shaped as to provide a ramp to lead up into the vehicle, instead of using a separate ramp as in FIGURE 2. This is illustrated in FIGURE 5.

The invention is also applicable to vehicles for operation over water of the type in which the cushion of pressurized air is contained along the sides of the vehicle by downwardly depending walls. FIGURE 6 illustrates the application of the arrangement shown in FIGURE 4 to such a vehicle. In operation the cushion is contained along the sides of the vehicle by side-walls 35, the gaps between the ends of the side-walls being closed by the air curtains 9 issuing from the supply ports 6.

In operation the vehicle is supported above the surface of the water by the cushion of pressurized air formed in the space 10, the lower parts of the side-walls being immersed. When the vehicle is to be loaded or unloaded, the air supply to the supply port 6 is cut off and the vehicle floats on the water, normally with the water surface level with the under-surface of the bottom 2 of the vehicle. The structure 3 is rotated upwards as in the example illustrated in FIGURE 4.

FIGURES 7, 8 and 9 illustrate a vehicle embodying one particular form of the invention. As will be seen from FIGURE 9 which is a cross-section on the line A—A of FIGURE 7, the vehicle is channel-shaped, having a flat load carrying floor 40 with upwardly extending walls 41. The spaces between the ends of the walls are closed by structures 42 and 43 of the form illustrated in FIGURES 1 and 2. Air is fed to the ducts 7 in the structures 42 and 43 from compressors 44 positioned in the side-walls 41. The air is fed from the compressors 44 via ducts 45, the ends of which co-operate with the ends of the ducts 7 of FIGURES 1 and 2 and ducts 16 of FIGURE 3 when the structures 42 and 43 are in the downward, or closed, position. The compressors 44 draw in air through intakes 46.

Also situated in the walls 41 are compressors 47 driven by engines 48. The compressors 47 draw in air through intakes 49 and feed it via ducts 50 to supply ducts 51 extending along the bottom of each wall. The air issues from the supply ducts 51 through ports 52 to form curtains of air 53. Space can also be provided in the walls 41 for passengers, freight and the like.

The walls are connected at the top by a bridge structure 55. The vehicle is controlled from this bridge in the normal manner. Engines 56, can be mounted on the bridge structure to propel the vehicle.

The vehicle can be unloaded or loaded at both ends simultaneously by opening both structures 42 and 43. Alternatively if cars or other vehicles are being carried, unloading can proceed one end whilst loading proceeds at the other.

We claim:

1. A vehicle for travelling over a surface of the type which in operation is supported above the surface by at least one cushion of pressurized gas formed beneath the vehicle, comprising a main body including a load bearing floor having a bottom surface against which the cushion pressure is exerted, means including a supply port positioned outboard of said floor adjacent the bottom surface thereof for causing at least one curtain of moving fluid to issue from the lower part of the vehicle for partially containing said cushion, a structure pivotally attached to said main body for upward movement about a horizontal axis to a raised position above said bottom surface, said pivoted structure normally closing an opening in the periphery of said main body through which loads may be conveyed on and off the vehicle and said axis being positioned a sufficient distance above the bottom surface of said main body that, when said structure has been moved to its raised position, such loads may pass through said opening beneath said structure, and means carried by said pivoted structure for supplying curtain-forming fluid to said supply port.

2. A vehicle as claimed in claim 1 wherein said supply port is formed in said pivoted structure, and said means for supplying curtain-forming fluid to said supply port includes ducting within said pivoted structure for delivering fluid to said supply port.

3. A vehicle as claimed in claim 2, including ducting in said main body of the vehicle with which the ducting in said pivoted structure communicates when said structure is in its normal lowered position.

4. A vehicle as claimed in claim 2 including means carried by said pivoted structure for recovering into said structure at least part of the curtain-forming fluid which issues from said supply port and causing said fluid to re-issue from said supply port as curtain-forming fluid.

5. A vehicle as claimed in claim 4 including means for re-energizing the recovered fluid.

6. A vehicle as claimed in claim 1 wherein said means for supplying curtain-forming fluid to said supply port includes a rotary pump having an axis of rotation coincidental with the pivotal axis of said pivoted structure and a casing which is attached to and pivots with said structure.

7. A vehicle as claimed in claim 1 wherein said pivoted structure extends across one end of said main body of the vehicle and said axis is normal to the fore and aft direction of the vehicle.

8. A vehicle as claimed in claim 1 including hydraulically actuated means for raising and lowering said pivoted structure about said axis.

9. A vehicle for travelling over a surface of the type which in operation is supported above the surface by at least one cushion of pressurized gas formed beneath the vehicle, comprising a main body including a load bearing floor, having a bottom surface against which the cushion pressure is exerted, a member attached to and extending outward from said main body adjacent a portion of the periphery of said floor, means including a supply port formed in said member for causing at least one curtain of moving fluid to issue from the lower part of the vehicle for partially containing said cushion, a vertically extending structure pivotally attached to said main body adjacent the upper end of said structure for upward movement about a horizontal axis to a raised position above said floor, said structure normally closing an opening in the periphery of said main body through which loads may be conveyed on and off the vehicle and said axis being positioned a sufficient distance above said floor that, when said pivoted structure has been moved to its raised position, such loads may pass through said opening beneath said structure, the lower part of said pivoted structure being in contact with the member in which said supply port is formed when said structure is in its normal lowered position, and means carried by said pivoted structure for supplying curtain-forming fluid to said supply port when said structure is in its normal lowered position.

10. A vehicle for travelling over a surface of the type which in operation is supported above the surface by at least one cushion of pressurized gas formed beneath the vehicle, comprising a main body having a load bearing floor, a vertically extending structure pivotally attached to said main body for movement about a horizontal axis adjacent the upper end of said structure, means for raising and lowering said pivoted structure about said axis, said structure normally closing an opening in one end of said main body through which loads may be conveyed on and off the vehicle and said axis being positioned a sufficient distance above said floor that, when said structure has been moved to its raised position, such loads may pass through said opening beneath said structure, and means including a supply port formed in the lower end of said pivoted structure for causing at least one curtain of moving fluid to issue from the lower part of the vehicle for partially containing said cushion.

11. A vehicle as claimed in claim 10 wherein said last named means includes a rotary pump having an axis of rotation coincidental with the pivotal axis of said pivoted structure, a casing which is attached to and pivots with said structure, and ducting within said structure connecting the outlet of said pump to said supply port.

12. A vehicle for travelling over a surface of the type which in operation is supported above the surface by at least one cushion of pressurized gas formed beneath the vehicle, comprising a main body having a load bearing floor, a wall depending below said body on each side thereof, extending in the fore and aft direction of the vehicle and containing the cushion for at least part of its periphery along the side of the vehicle, vertically extending structure pivotally attached to said main body for movement about a horizontal axis extending parallel to the bottom surface of said floor and normal to said depending walls, means for raising and lowering said pivoted structure about said axis, said structure normally closing an opening in one end of said main body through which loads may be conveyed on and off the vehicle and said axis being positioned a sufficient distance above said floor that, when said structure has been moved to its raised position, such loads may pass through said opening beneath said structure, and means including a supply port formed in the lower end of said pivoted structure adjacent the bottom surface of said floor for causing at least one curtain of moving fluid to issue from said structure and to cooperate with said depending walls for containing said cushion.

References Cited by the Examiner

UNITED STATES PATENTS 3,066,753 12/62 Hurley et al. _____ 180—7
3,114,519 12/63 Carter _____ 180—7

FOREIGN PATENTS 1,238,499 7/60 France.

A. HARRY LEVY, *Primary Examiner.*

PHILIP ARNOLD, *Examiner.*